(12) United States Patent
Kramer et al.

(10) Patent No.: US 6,842,571 B2
(45) Date of Patent: Jan. 11, 2005

(54) OPTICAL INTERCONNECT SYSTEM WITH LAYERED LIGHTPIPE

(75) Inventors: Wayne C. Kramer, Villa Park, IL (US); Daniel R. Schroeder, Carol Stream, IL (US); Hans R. Merz, Naperville, IL (US); Gerald W. Ballard, West Dundee, IL (US); Robert R. Kornowski, Schaumburg, IL (US); Jang-Hun Yeh, Irvine, CA (US); James K. Gehrke, Lake in the Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 68 days.

(21) Appl. No.: 10/235,735

(22) Filed: Sep. 5, 2002

(65) Prior Publication Data

US 2004/0047563 A1 Mar. 11, 2004

(51) Int. Cl.[7] ............................. G02B 6/26; G02B 6/42
(52) U.S. Cl. .......................................... 385/47; 385/24
(58) Field of Search ............................. 385/24–26, 36, 385/39, 47, 46, 14, 88, 89

(56) References Cited

U.S. PATENT DOCUMENTS

| 4,302,069 A | * | 11/1981 | Niemi | 385/46 |
| 4,400,054 A | * | 8/1983 | Biard et al. | 385/36 |
| 5,093,890 A | * | 3/1992 | Bregman et al. | 385/146 |
| 5,305,401 A | * | 4/1994 | Becker et al. | 385/24 |
| 5,757,994 A | * | 5/1998 | Schoenwald et al. | 385/44 |
| 5,978,526 A | * | 11/1999 | Morikuni et al. | 385/14 |
| 6,097,864 A | * | 8/2000 | Kropp | 385/44 |
| 6,310,992 B1 | * | 10/2001 | Gehrke et al. | 385/24 |

* cited by examiner

Primary Examiner—Joseph Williams
Assistant Examiner—Peter Macchiarolo
(74) Attorney, Agent, or Firm—Fitch, Even, Tabin & Flannery

(57) ABSTRACT

An optical interconnect system includes a stacked arrangement of optical lightpipe layers, one layer assigned to each emitter of the system. The various optical lightpipe layers are designed to provide the same level of light to each receptor of the system. The optical lightpipe layers are very thin, allowing the emitter and receptor devices of the system to span the entire optical lightpipe layer assembly. The path loss between every emitter and every receptor over the entire system can be balanced, i.e., made substantially the same, or otherwise set as desired with respect to individual emitters and receptors.

30 Claims, 5 Drawing Sheets

OPTICAL INTERCONNECT SYSTEM WITH LAYERED LIGHTPIPE

BACKGROUND OF THE INVENTION

The present invention pertains to optical interconnect systems and in particular to such systems having multiple points of access.

DESCRIPTION OF THE RELATED ART

In prior art multi-point optical interconnect systems, light deflecting features create a variable path loss between the various emitters and receptors employed. For example, adjacent devices typically have much less loss than distant devices. Accordingly, signal level equalization or automatic gain control (AGC) has been employed. Equalization carried out at the emitter is difficult or impossible to implement where there are many receptors and the path loss to each receptor is different. Equalization at the receptor sites is difficult to implement since it cannot be determined which emitter is active at a given time and accordingly equalization is not possible for many practical multi-point contention-based systems. Although automatic gain control concepts can be applied with very short packet durations, the automatic gain control settling time can cause unacceptable reductions in data through-put.

SUMMARY OF THE INVENTION

Balanced optical transmission levels within multi-point optical interconnect systems is desirable. As mentioned above, equalization solutions do not afford acceptable corrections to an inherently unbalanced optical interconnect system. With the present invention, optical interconnect systems are provided with uniform signal distribution to all of the modules employed, by using dedicated optical lightpipe layers designed for transceivers at different positions. Each optical lightpipe layer has its own dedicated optical channel with optimized deflecting areas designed to distribute light signals evenly to each receptor port in the system. In the preferred embodiment, each optical lightpipe layer is "matched" to a particular emitter in the system. Accordingly, the optical lightpipe layer can be designed for specific path losses to each of the emitters of the system. Preferably, the optical lightpipe layers are very thin, allowing the optical devices to span the entire stack of optical lightpipe layers. Each optical lightpipe layer is designed to provide the same level of light to each receptor, minimizing the dynamic range requirements of the receptors of the system. Preferably, the path loss between every emitter and every receptor is the same for all layers, although other matching characteristics could also be provided, if desired.

DETAILED DESCRIPTION OF THE PREFERRED EMBODIMENTS

Figure 1:
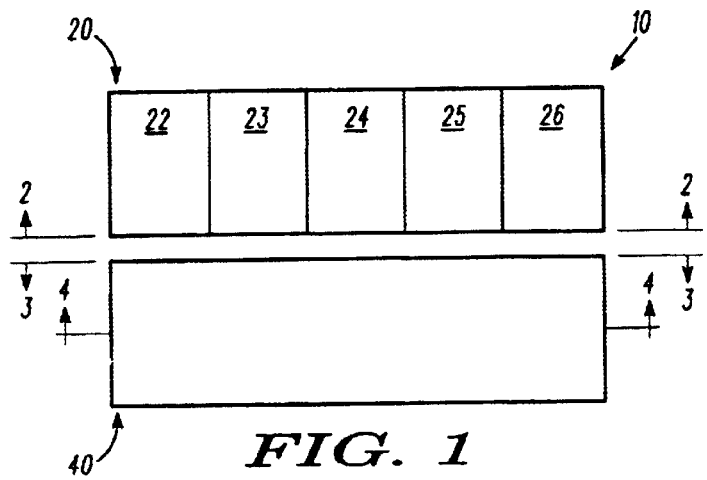
FIG. 1 is a top plan view of an optical interconnect system according to principles of the present invention.
Figure 2:
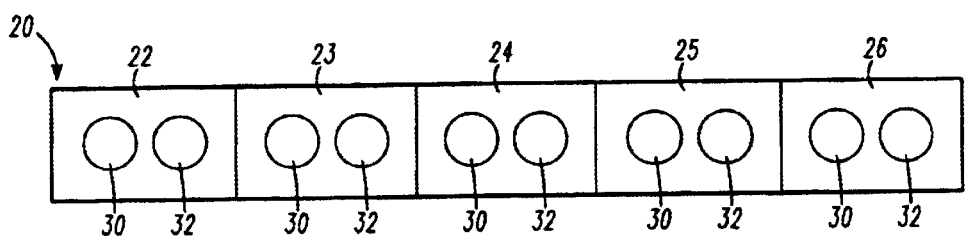
FIG. 2 is a front elevational view of the emitter/receptor modules looking in the direction of arrows 2—2 of FIG. 1.
Figure 3:
FIG. 3 is a front elevational view of the layered lightpipe assembly, looking in the direction of arrows 3—3 of FIG. 1.

Referring now to the drawings, and initially to FIGS. 1–7, an optical interconnect system 10 is constructed according to principles of the present invention. Optical interconnect system 10 preferably has a multipoint construction with multiple communication channels. In the embodiment illustrated in FIG. 1, five (5) communication channels are provided.

Figure 6:
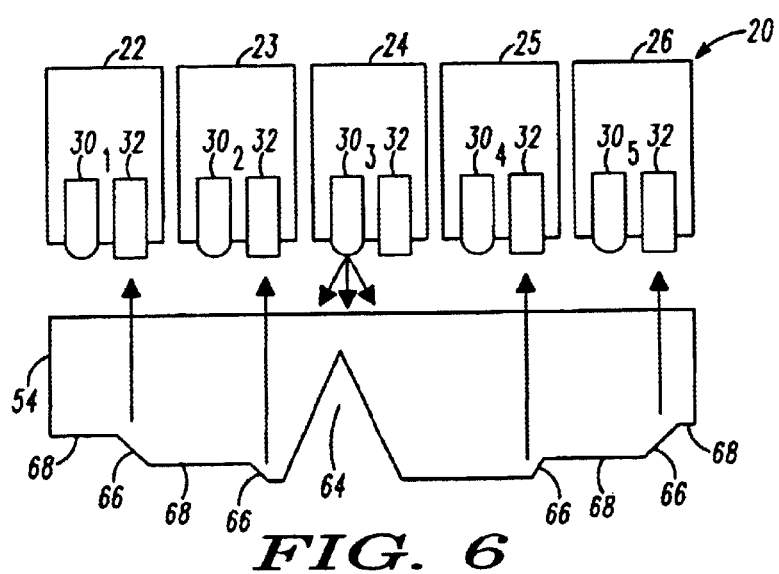
FIG. 6, is a cross-sectional view taken along the line 6—6 of FIG. 4.

Included in system 10 is an emitter/receptor assembly generally indicated at 20 including five (5) emitter/receptor modules 22–26. With reference to FIG. 6, each module includes an emitter 30 and a receptor 32. The forward or active ends of the emitters 30 and receptors 32 are indicated in FIG. 6 as projecting slightly beyond the body of the modules although they could be mounted flush or recessed, if desired. The modules 22–26 are of conventional construction and can comprise virtually any component commercially available for emitting and receiving optical signals. The emitters 30 have a convex surface at their forward end while the receptors have a concave surface at their forward end. Preferably, the emitters and receptors may have a flat surface, but may have other surface shapes, as well. The forward ends of the modules 22–26 face toward a layered lightpipe assembly generally indicated at 40. As can be see in FIG. 2, the modules 22–26 are arranged side-by-side in a serial array. As indicated in FIG. 1, the layered lightpipe assembly 40 extends substantially the entire width of the modules and especially the optically active portions of the modules comprising the emitter and receptor components.

Figure 4:
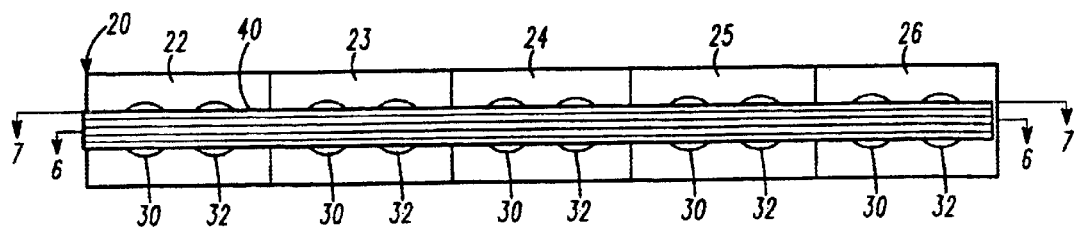
FIG. 4 is an elevational cross-sectional view taken along the line 4—4 of FIG. 1.

Referring to FIG. 4, the layered lightpipe assembly 40 is shown in its preferred alignment with the emitter/receptor assembly 20. As indicated in FIG. 4 and in the fragmentary enlarged view of FIG. 5, it will be seen that the layered lightpipe assembly 40 has a height or thickness slightly less than the active areas 30, 32 of the modules. As indicated in FIG. 4, the preferred layered lightpipe assembly extends across all of the active areas of all of the modules. Accordingly, light emitted from any of the modules could potentially illuminate all of the layers of the layered lightpipe assembly, so as to be detected at the receptors of all of the modules.

Figure 5:
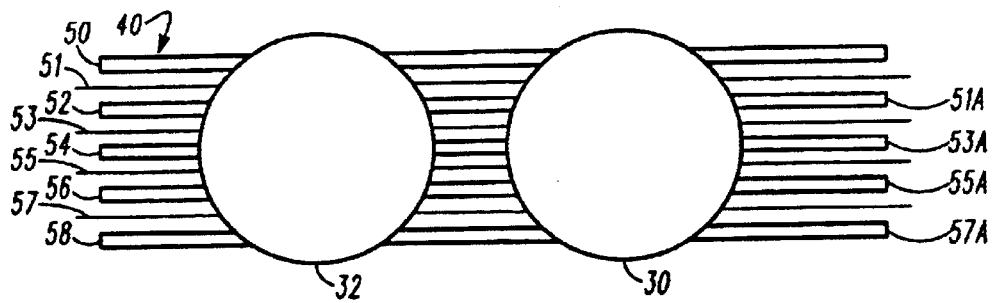
FIG. 5 is a fragmentary elevational view showing a portion of FIG. 4, taken on an enlarged scale.

Turning to FIG. 5, the layered lightpipe assembly 40 includes a plurality of layers of light conductive material such as LEXAN®, or polycarbonate, preferably in planar, i.e., sheet form. The layers are indicated by reference numerals 50, 52, 54, 56 and 58. Each of the layers 50–58 are employed to conduct optical signals with each layer operating as a lightpipe, optical wave guide, or optical transmission medium. Preferably, the layers 50–58 are identical to one another particularly with regard to phototransmission properties. Accordingly, it is preferred that the layers have a similar thickness and light transmissive quality, which is preferably homogeneous throughout the entire layer, so as to simplify the balancing of illumination to all of the receptors receiving communication from the particular layer. As mentioned above, the relative size of the lightpipe assembly 40 with respect to the emitter and receptor portion of each module allows any emitter to communicate with any receptor of the emitter/receptor assembly 20. As mentioned above, the number of layers in the lightpipe assembly preferably corresponds to the numbers of emitters, which, in the preferred embodiment illustrated herein, corresponds to the number of modules employed.

Turning again to FIG. 5, at is generally preferred that optical isolator layers 51, 53, 55 and 57 be placed between respective pairs of optical lightpipe layers to prevent communication of optical signals from one layer to another. For particular applications and types of lightpipe layers, cross-layer optical communication may be negligible and accordingly the isolator layers could be omitted. It should also be noted that, in place of discrete isolator layers, each optical lightpipe layer could be coated with either a light reflective coating or a light blocking coating 51A, 53A, 55A, and 57A, which would prevent or reduce emanation of optical energy outside the particular layer. In the preferred embodiment illustrated, where a single planar array of modules is provided, cross-layer communication would not give rise to inter-channel interference, but rather might result in excessive coupling which could overload a responsive receptor. As will be seen herein, it is generally preferred that at least some of the receptors are made non-responsive during operation of the optical interconnect system.

Turning now to FIG. 6, the module assembly is illustrated in conjunction with a single optical lightpipe layer 54. As mentioned, it is generally preferred that the number of optical lightpipe layers correspond to the number of emitters employed, which herein preferably corresponds to the number of modules employed. It is preferred that an optical lightpipe layer be "dedicated" to a particular emitter. For example, as indicated in FIG. 6, the emitter of the third module 24 is assumed to be active. In the preferred embodiment, the emitter for module 24 is "matched" to optical lightpipe layer 54, which is configured to provide that level of light originating at the emitter of module 24 is received generally equally (at the receptor) for any of the modules employed. This equalization allows the receptor to receive generally equal optical signals from all emitters keeping the device within the active region without relying on gain control changes. In the arrangement described, it is preferred that the receptor of module 24 is not required to process light from the emitter of module 24. Although some amount of incident light from the emitter of module 24 could be incident on the receptor of module 24, any output for this described instance of operation would be blocked or otherwise ignored.

As mentioned above, it is preferred that the optical loss from the emitter of module 24 to the receptors of the other modules is made to be at least approximately the same. With regard to all of the lightpipe layers of assembly 40, it is preferred that the path loss between every emitter and every receptor of optical interconnect system 10 is made to be the same with respect to all optical lightpipe layers.

Accordingly, for the optical lightpipe layer 54 illustrated in FIG. 6, path loss from the emitter of module 24 to the receptors of the other modules is calculated using known techniques. Provided in optical lightpipe layer 54 are a plurality of signal reflecting means, preferably in the form of notches or exposed edge portions which operate as light reflecting surfaces. For example, referring to the rear edge of optical light pipe layer 54 (that is, the edge remote from the module assembly) portions of the sheet of light guide material is removed or "notched" to form a V-shaped opening 64, angled edge portion 66 and recessed or stepped portions 68, which are cut back from the full width of the sheet of optical material from which the optical lightpipe layer 54 is fabricated. The interior surfaces of features 64 and 66 form light reflective surfaces, as is known in the art. The geometry, i.e., the shape and size of the features 64 and 66 is chosen such that the combined reflection from these features incident on the receptors is such that the path loss to each receptor is made to be the same, or in other terms, the output of the receptors is made to be the same, i.e., is responsive to similar amounts of light (assuming that the transfer characteristics of each receptor are made to be generally the same).

Figure 7:
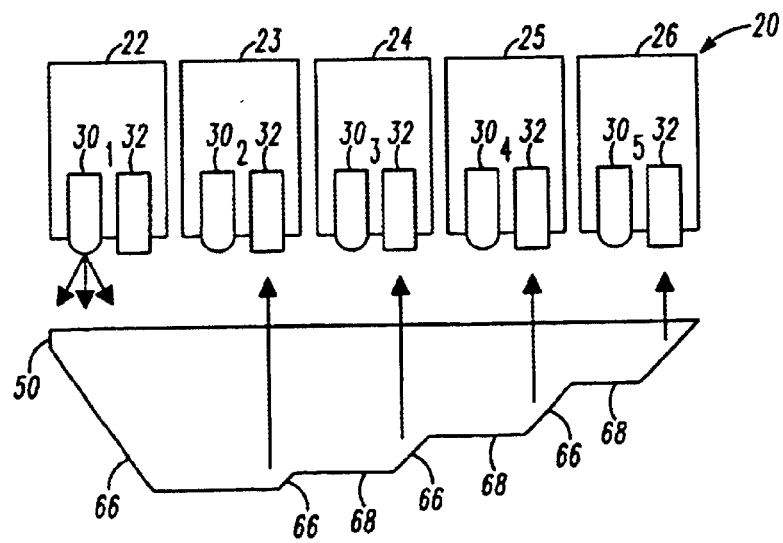
FIG. 7 is a cross-sectional view taken along the line 7—7 of FIG. 4.
Figure 8:
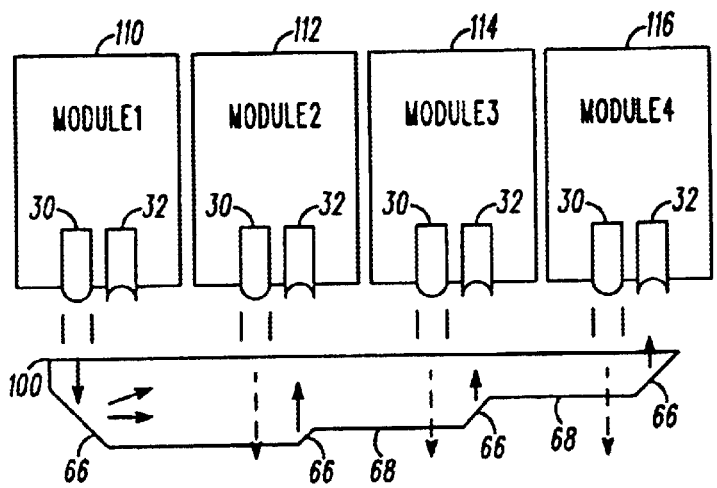
FIG. 8 is a cross-sectional view taken along the line 8—8 of FIG. 15.

Referring to FIG. 7, an optical interconnect arrangement is shown for optical lightpipe layer 50, which is "matched" to the emitter 30 of module 22. As mentioned above, it is generally preferred that a single, planar array of modules is employed, with each module having a single emitter and a single receptor, with any optical response of a receptor for an emitting module being ignored. As indicated in FIG. 7, angled notches or rearward edge surfaces 66 are employed to reflect light from the emitter of module 22 to the receptor of the remaining modules such that the amount of light from a particular source and incident on the receptors of the remaining modules is substantially the same. In a preferred embodiment illustrated in FIG. 7, a number or rearward stepped surfaces 68 are interposed between the angled surfaces 66. In the preferred embodiment illustrated in FIG. 7, only the angled surfaces 66 play an active role in balancing the light communication paths from the emitter of module 22 to the receptors of the remaining modules. If desired, the angled and stepped edges at the rear of optical lightpipe layer 50 could be replaced by a single continuously curved edge, having a serpentine form generally following the path of angled and stepped edges shown in FIG. 7.

Figure 14:
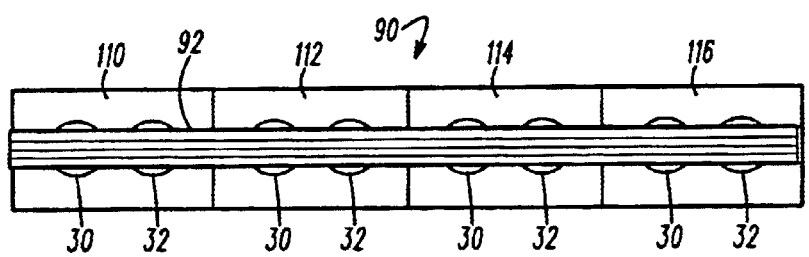
FIG. 14 is an elevational view showing an alternative optical interconnect system according to principles of the present invention.
Figure 15:
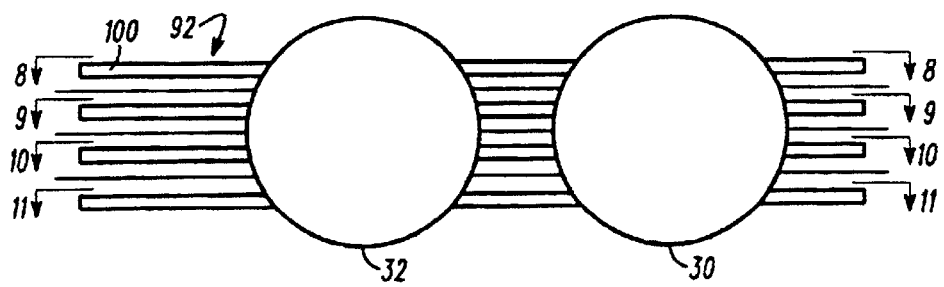
FIG. 15 is a fragmentary view showing a portion of FIG. 14 taken on an enlarged scale.

Referring now to FIG. 14, an optical interconnect system 90 is shown. Generally speaking, optical interconnect system 90 is similar to the optical interconnect system 10 described above, except that four modules, rather than five, are employed. In the optical interconnect system 90 the number of layers in layered lightpipe assembly 92 is made equal to the number of modules employed. That is, four layers 100, 102, 104 and 106 are provided, corresponding to the four modules 110, 112, 114 and 116. In the optical interconnect system 90 the modules 110–116 each employ a single emitter 30 and a single receptor 32. FIGS. 8–11 show the optical interconnection between the modules and each respective optical lightpipe layer. For example, in FIG. 8 optical lightpipe layer is shown transmitting or guiding balanced light level signals from the emitter 30 of module 110 to the receptors 32 of the other modules 112–116. Again, as with the preceding embodiment, optical lightpipe layer 100 has reflective surfaces of well-defined size and angular position so as to ensure that the incident light from a given source and reflected by the various angled surfaces and incident on the various receptors has generally the same optical strength. Accordingly, four receptors which are well matched, i.e., have the same transfer characteristics, the signals emitted from the receptors of the various modules are also matched to each other.

Figure 9:
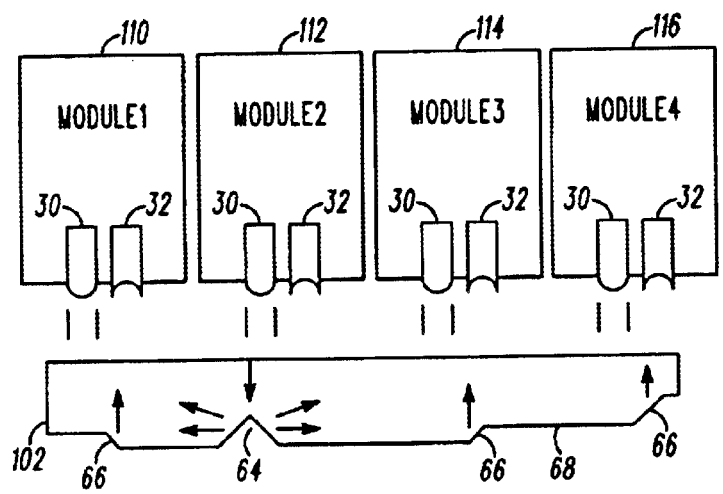
FIG. 9 is a cross-sectional view taken along the line 9—9 of FIG. 15.
Figure 10:
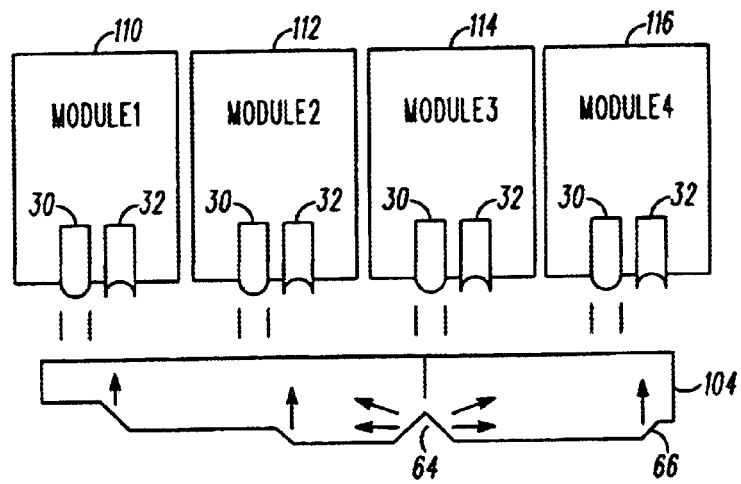
FIG. 10 is a cross-sectional view taken along the line 10—10 of FIG. 15.

In the arrangement of FIG. 9 optical lightpipe layer 102 is "matched" to the emitter 30 of module 112. As can be seen in FIG. 9, a V-shaped recess or notch 64 is employed in addition to angled cuts 66 and stepped cuts 68. The V-shaped cut 64 operates as two angled cuts placed back to back. In the arrangement illustrated in FIG. 10, optical lightpipe layer 104 guides, transmits or relays optical signals of similar strength from emitter 30 of module 114 to the receptors 32 of the remaining modules. Again, the angled and stepped cuts provide optical signals of similar strength to the receptors of the remaining modules.

Figure 11:
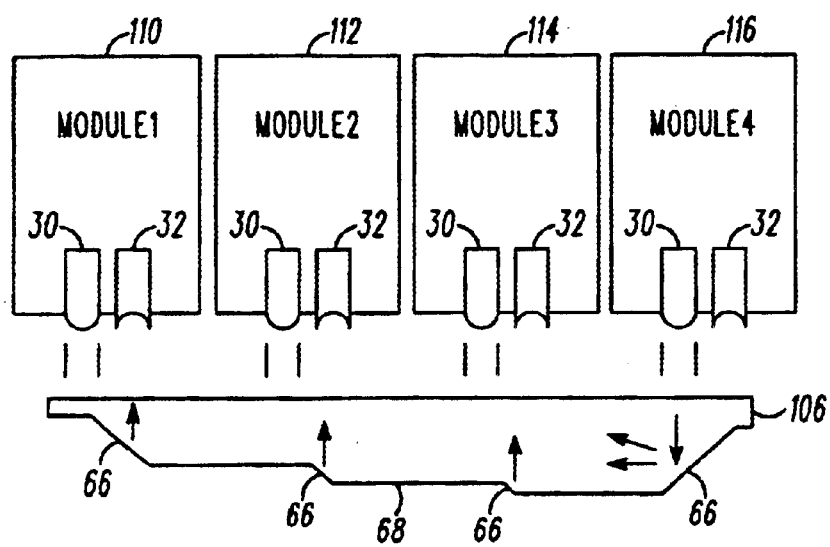
FIG. 11 is a cross-sectional view taken along the line 11—11 of FIG. 15.

Turning now to FIG. 11, optical lightpipe layer 106 is "matched" to the emitter 30 of module 116. Optical lightpipe layer 106 provides balanced, constant strength optical signals to the receptors 32 of modules 110–114.

As can be seen by comparing the optical lightpipe layers of optical interconnect systems 10 and 90, the reflecting features formed at the rear edge of the optical lightpipe layers can be condensed or spread out in directions parallel to the module faces. In this regard, either the modules can be spaced greater distances from one another.

As indicated in FIGS. 4 and 14, the optical lightpipe layer is made thinner than the active areas of the emitters and receptors of the modules employed, and accordingly each optical lightpipe layer is made much smaller than the active areas of the emitters and receptors. In practice, the sheets of lightpipe material can be made very thin in comparison to the active areas of the emitters and receptors. In order to increase the overall signal level of the optical interconnect system, it may be desirable to make the thickness of the optical lightpipe layers as great as possible so as to reflect more light energy.

Figure 12:
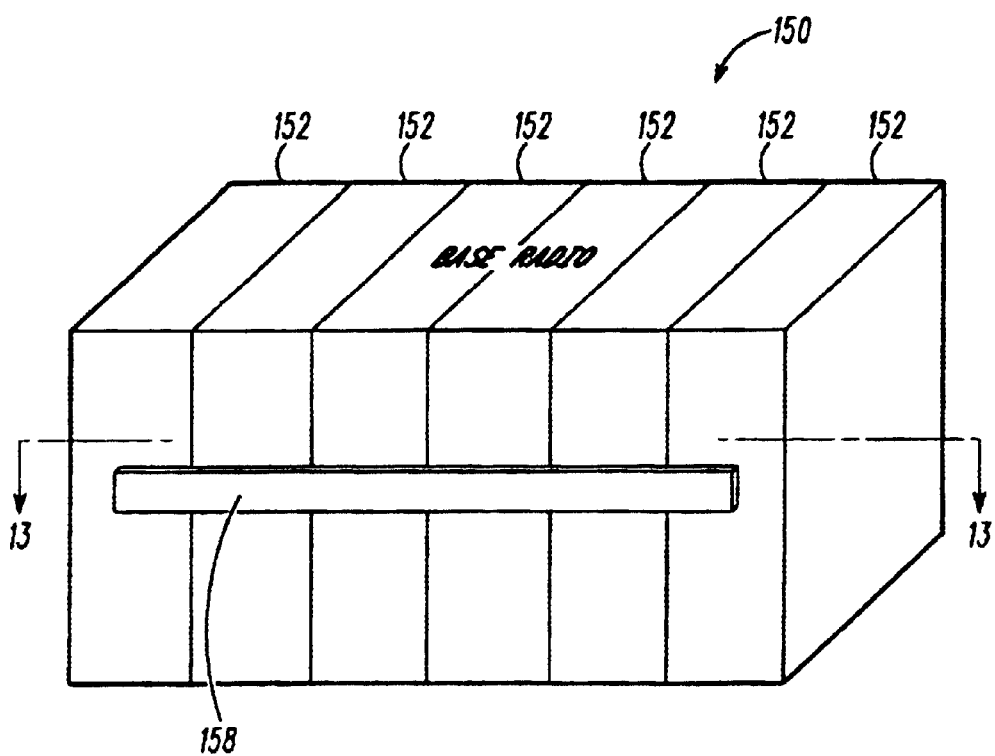
FIG. 12 is a schematic view of a base radio station.
Figure 13:
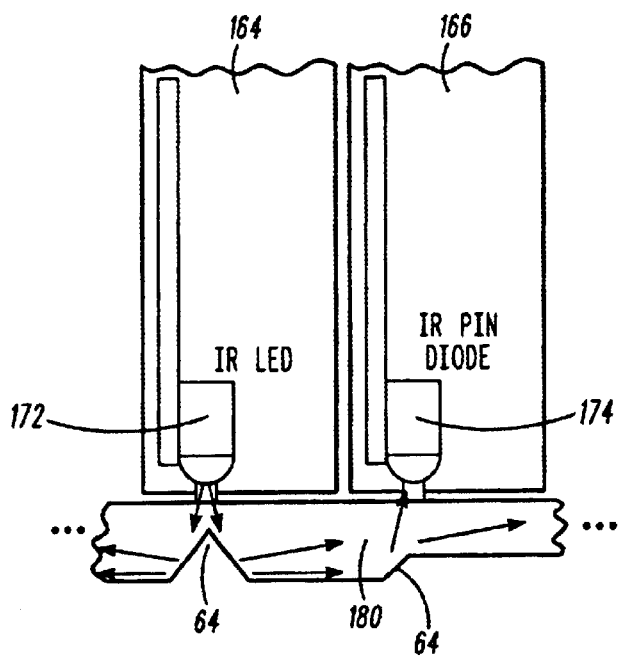
FIG. 13 is a fragmentary cross-sectional view taken along the line 13—13 of FIG. 12.

The present invention has found immediate application in the field of mobile radio communications, and particularly with the base stations of such systems. Referring now to FIG. 12, a portion of a base station radio system is generally indicated at 150 included in the arrangement is a card cage containing multiple optical card components 152, the communications of which are coupled together through a lightpipe back plane 158, which provides an improved band width and reduced EMI/EMC effects. Typically, a light deflecting mechanism is needed to redirect the light emitted from the various cards to a direction parallel to the lightpipe. The light deflection is typically accomplished by means of a light-deflecting feature incorporated into the lightpipe. However, in previous arrangements the path loss between emitters and receptors is variable. For example, adjacent devices have much less loss than distant devices. Borrowing from earlier electronics designs, compensating mechanisms such as automatic gain control circuits are constructed to operate in an optical domain. However, such solutions suffer from practical set up times for the automatic gain control circuits, which inhibits the bandwidth of the overall system. Accordingly, a need has arisen for an improved method to couple light between emitters and receptors of the system with the coupling independent of the various inter-device distances. With reference to FIG. 13, a fragment of the system is shown with a pair of card assemblies 164, 166 which correspond to the card assemblies 152 of FIG. 12. Card assembly 164 is shown with an optical emitter 172, which for example is of the infrared light emitting diode type. Virtually any type of emitter could be employed as desired. Card assembly 166 is shown with a solid-state receptor such as an infrared pin diode 174, although virtually any type of receptor, solid state or otherwise, could be employed. Communication between the optical elements 172, 174 is provided by an optical lightpipe layer 180 constructed according to the principles indicated above. For example, optical lightpipe layer 180 includes a pair of V-shaped cut out portion 64 which provide reflective surfaces within the optical lightpipe layer which cooperate to form optical guiding paths between emitters and receptors such that the optical signal intensity, power or strength is balanced, i.e., made generally the same, at each receptor, with respect to each emitter.

Several variations are possible. For example, the recesses, notches or cut outs in the various optical lightpipe layers described above are formed by what may be termed "flat" cuts made in a generally vertical direction, such that the exposed edge is generally perpendicular to the major surfaces of the optical lightpipe layer. If desired, those edges could be made concave when viewed from within the optical lightpipe layer, i.e., convex, when viewing the optical lightpipe layer "on edge" from a point of view outside the optical lightpipe layer. The edge surfaces formed at the rear of the optical lightpipe layer can take on virtually any surface shape desired using conventional cutting tools available today, such as tooling cutters, EDM or laser techniques.

As a further alternative, the exposed edges forming the interior reflective angles of the communication paths between emitters and reducers can be silvered or coated with a reflective coating, if desired, in order to enhance reflective levels. Further, such techniques may be employed for only some of the optical paths involved, especially those paths more distant from the light source. Conversely, a signal strength that's too great at the immediately adjacent modules, the exposed surfaces can be roughened or otherwise treated in a known manner to reduce the amount of energy reflected to the nearby modules. Thus, a greater range of adjustment can be provided. As mentioned above, the various interior reflective angles within the optical lightpipe are provided by notching cutting or otherwise exposing angled and other reflective surfaces at the rear of the optical lightpipe layer. If desired, the optical lightpipe layer can be provided in rectangular sheets with the reflective surfaces formed by piercing the sheets to provide reflecting surfaces as described above without requiring substantial portions of the lightpipe material being removed. In this manner, compromises to the physical integrity of the optical lightpipe layers can be eliminated. If desired, fluids could be injected in the slots formed and such fluids could serve as carriers for light reflecting or light blocking materials.

As indicated above, it is generally preferred that the receptor for an emitting module has its output blocked or otherwise ignored by the external control system, i.e., the control system external to the optical interconnect system. For example, the modules can be operated in a FireWire system according to IEEE 1394 Standard. Such systems can be configured such that only one emitter of the module assembly is permitted to emit at a given time. Further, the same systems can control which receptors are to be permitted access to the external control system and which receptors are to be blocked. For example, with reference to FIG. 11, the emitter of module 116 is emitting optical energy under control of the FireWire system. Balanced optical signals are reflected, transmitted or guided to the receptors of the remaining modules 110–114. If desired, for example, any two of the three remaining modules can be blocked by the FireWire control system, leaving only one module capable of receiving optical information, which is then transmitted to the external control system for further processing. FireWire control systems have been mentioned, although virtually any control system known today could be employed as well to control operation of the emitters and receptors in a desired manner.

As mentioned above, features formed in the rear of the optical lightpipe layers are employed to provide reflective angles, i.e., desired communication paths, within the optical lightpipe layer. Further, as indicated, in its desired role that the emissions from one module falling on the receptors of the remaining modules are balanced in strength, power or intensity, for example, so as to produce balanced output signals from the receptors without requiring external circuitry such as automatic gain control circuits. The angles and sizes of reflective surfaces formed by the notches or cut outs can be adjusted such that the incident levels at the receptors are balanced, and this can be calculated in a known manner using OptiCAD software or the like.

As an alternative, the number of lightpipe layers could correspond to the number of receptors, with each lightpipe layer having reflective surfaces matched to a respective receptor for balanced reception with regard to any emitter.

As mentioned above, the present invention can be employed to balance the various communication paths between pairs of emitters and receptors. This balancing, as pointed out above, can be achieved by arranging the reflective surfaces such that the light at the receptors of interest have generally the same strength from receptor to receptor. That is, the light at the receptors has a strength or a decibel variation held within predetermined maximum limits. It should be kept in mind, however, that the reflective surfaces of the light guide layers can be arranged to provide virtually any path loss characteristic between individual emitters and receptors, that may be desired. For example, emitters and/or receptors of different efficiencies and response characteristics may be employed within a common optical interconnect system. With the present invention, path losses between individual pairs of emitters and receptors can be predeterminedly set by modifying the reflective surfaces of the light guide layers, so as to selectively increase or decrease the amount of signal energy arriving at a particular receptor.

While the principles of the invention have been described above in connection with a specific apparatus, it is to be clearly understood that this description is made only by way of example and not as a limitation on the scope of the invention.

What is claimed is:

1. An optical interconnect system, comprising:
   a pre-selected number of modules arranged side-by-side in a serial array lying in a common reference plane;
   each module including an emitter and a receptor,
   a plurality of light guide layers equal in number to the number of emitters arranged in a serial array one on top of the other to form a stack extending in a direction perpendicular to said reference plane and positioned for optical communication with the emitters and receptors of the modules;
   each light guide layer including a plurality of reflective surfaces reflecting signals from an emitter of one said module to at least some of the receptors of the other modules; and
   the reflective surfaces are arranged such that the light at the receptors of said at least some of said receptors have a predetermined strength from receptor to receptor.

2. The system of claim 1 wherein said optical light guide layers comprise generally planar layers of optical light guide material.

3. The arrangement of claim 1 wherein the number of light guide layers is equal to the number of modules.

4. The system of claim 1 wherein said optical light guide layers are spaced apart one from another.

5. The system of claim 4 further comprising optical isolator layers between adjacent pairs of optical light guide layers.

6. The system of claim 1 wherein said optical light guide layers include a coating of optical isolator material to prevent transmission of light between adjacent pairs of optical light guide layers.

7. The system of claim 1 wherein the light guide layers are of generally similar size.

8. The system of claim 1 wherein said plurality of optical light guide layers are stacked one on top of another.

9. The system of claim 1 wherein said plurality of optical light guide layers has an overall thickness and said emitters and receptors have active areas larger than said overall thickness such that optical energy emitted from any emitter is incident on all of the optical light guide layers and light transmitted to any of the light guide layers is incident on all of the receptors.

10. The system of claim 1 wherein said reflective surfaces of said light guide layers is formed by cutting away a portion of said optical light guide layers.

11. The system of claim 10 wherein said optical light guide layers include a forward edge immediately adjacent said modules and an opposed rearward edge and said cut away portions comprise portions removed from the rearward edges of said optical light guide layers.

12. The system of claim 11 wherein said reflective surfaces include a coating of reflection-altering material.

13. The system of claim 1 wherein said optical light guide layers are comprised of transparent polycarbonate material.

14. The system of claim 1 wherein said optical light guide layers are formed of polycarbonate sheets.

15. The system of claim 1 wherein the reflective surfaces are arranged such that the light reflected by a light guide layer and received by receptors of said modules is generally equal in strength for each of the receptors of said modules.

16. The system of claim 1 wherein the optical light guide layers guide light from an emitter of a module to all of the receptors of the remaining modules.

17. The system of claim 1 wherein said reflective surfaces of said optical light guide layers comprise cuts in said optical light guide layer which are angled and non-parallel with respect to a direction perpendicular to the reference plane of the of serial array modules.

18. An optical interconnect system, comprising:
    a pre-selected number of modules arranged side-by-side in a serial array lying in a common reference plane;
    each module including an emitter and a receptor;
    a plurality of light guide layers arranged one on top of the other to form a stack extending in a direction perpendicular to said reference plane and positioned for optical communication with the emitters and receptors of the modules;
    each light guide layer including a plurality of reflective surfaces reflecting signals from an emitter of one said module to the receptors of the other modules;
    the reflective surfaces arranged such that the light reflected by a light guide layer and received by receptors of said modules have a predetermined strength from receptor to receptor.

19. The system of claim 18 wherein the number of optical light guide layers is equal to the number of emitters.

20. The system of claim 18 wherein said optical light guide layers comprise generally planar layers of optical light guide material.

21. The system of claim 20 wherein said reflective surfaces of said light guide layers is formed by cutting away a portion of said optical light guide layers.

22. The system of claim 18 further comprising optical isolator layers between adjacent pairs of optical light guide layers.

23. The system of claim 18 wherein said optical light guide layers include a coating of optical isolator material to prevent transmission of light between adjacent pairs of optical light guide layers.

24. The system of claim 18 wherein the reflective surfaces are arranged such that the light reflected by a light guide layer and received by receptors of said modules is generally equal in strength for each of the receptors of said modules.

25. An optical interconnect system, comprising:

a pre-selected number of modules arranged side-by-side in a serial array lying in a common reference plane;

each module including an emitter and a receptor;

a plurality of light guide layers equal in number to the number of emitters, arranged in a serial array one on top of the other to form a stack extending in a direction perpendicular to said reference plane and positioned for optical communication with the emitters and receptors of the modules;

each light guide layer including a plurality of reflective surfaces reflecting signals from an emitter of one said module to at least some of the receptors of the other modules; and the reflective surfaces arranged such that optical energy emitted from any emitter is incident on all of the optical light guide layers and light transmitted from any of the light guide layers is incident on all of the receptors.

26. The system of claim 24 wherein said optical light guide layers comprise generally planar layers of optical light guide material.

27. The system of claim 24 further optical isolator layers between adjacent pairs of optical light guide layers.

28. The system of claim 24 wherein said optical light guide layers include a coating of optical isolator material to prevent transmission of light between adjacent pairs of optical light guide layers.

29. The system of claim 24 said reflective surfaces of said light guide layers is formed by cutting away a portion of said optical light guide layers.

30. The system of claim 28 said optical light guide layers include a forward edge immediately adjacent said modules and an opposed rearward edge and said cut away portions comprise portions removed from the rearward edges of said optical light guide layers.

* * * * *

UNITED STATES PATENT AND TRADEMARK OFFICE
CERTIFICATE OF CORRECTION

PATENT NO. : 6,842,571 B2
DATED : January 11, 2005
INVENTOR(S) : Kramer et al.

It is certified that error appears in the above-identified patent and that said Letters Patent is hereby corrected as shown below:

Column 7,
Line 51, after "receptor" delete "," and insert -- ; --, therefor.

Column 8,
Line 48, after "the" delete "of".
Line 48, after "array" insert -- of --.

Column 10,
Line 13, after "further" insert -- comprising --.
Line 19, after "24" insert -- wherein --.
Line 22, after "28" insert -- wherein --.

Signed and Sealed this

Twelfth Day of July, 2005

JON W. DUDAS
*Director of the United States Patent and Trademark Office*